(12) United States Patent
Nakano

(10) Patent No.: US 7,630,629 B2
(45) Date of Patent: Dec. 8, 2009

(54) ACCESSORY UNIT AND CAMERA SYSTEM

(75) Inventor: Shingo Nakano, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 11/971,782

(22) Filed: Jan. 9, 2008

(65) Prior Publication Data

US 2008/0186590 A1    Aug. 7, 2008

(30) Foreign Application Priority Data

Feb. 2, 2007    (JP) ............................ 2007-024176

(51) Int. Cl.
*G03B 11/00*    (2006.01)
*G02B 21/00*    (2006.01)
(52) U.S. Cl. ...................... 396/544; 359/600
(58) Field of Classification Search ................. 396/448, 396/540, 541, 544; 359/511, 600, 611; 348/333.01
See application file for complete search history.

(56) References Cited

U.S. PATENT DOCUMENTS 4,576,459 A * 3/1986 Miura et al. ................ 396/534

5,784,207 A    7/1998 Satoh

FOREIGN PATENT DOCUMENTS

| JP | 2-89435 A | 3/1990 |
|---|---|---|
| JP | 4-130932 A | 5/1992 |
| JP | 9-222569 A | 8/1997 |

\* cited by examiner

*Primary Examiner*—W. B. Perkey
*Assistant Examiner*—Minh Q Phan
(74) *Attorney, Agent, or Firm*—Canon U.S.A., Inc. I.P. Division

(57) ABSTRACT

An accessory unit mountable on an eyepiece portion includes an engaging member having an engaging claw portion engageable with the eyepiece portion, an operating portion configured to manipulated by a user so that the engaging claw portion is displaced in a direction of releasing the engagement of the engaging claw portion and the eyepiece portion, and a mechanism portion configured to displace the engaging claw portion in a direction such that the engaging claw portion and the eyepiece portion are engaged with each other when a force is applied to the accessory unit mounted on the eyepiece portion in a direction opposite to the mounting without manipulating the operating portion.

10 Claims, 8 Drawing Sheets

ACCESSORY UNIT AND CAMERA SYSTEM

BACKGROUND OF THE INVENTION

1. Field of the Invention

The present invention relates to an accessory unit detachably attached to an eyepiece portion of a camera body and a camera system including the accessory unit and the camera body.

2. Description of the Related Art

Conventionally, a finder eyecup of the camera is attached to an eyepiece frame of the camera. The eyecup is used highly frequently to prevent interruption of shooting by incidence of the outside light when a user looks through the finder.

This type of the finder eyecup is discussed, for example, in Japanese Utility Model Application Laid-Open Nos. 2-89435 and 4-130932, and Japanese Patent Application Laid-Open No. 9-222569.

According to Japanese Utility Model Application Laid-Open No. 2-89435, an eyecup claw provided in the eyecup is fitted into an eyepiece frame groove formed in the eyepiece frame of the camera body, so that the eyecup claw is elastically deformed and mounted on the eyepiece frame. A claw portion formed in the eyecup claw is engaged with a step portion formed in the eyepiece frame, so that the eyecup cannot easily come off. Japanese Utility Model Application Laid-Open No. 2-89435 discusses an improved type in which the eyecup is provided with an operating portion to allow the eyecup claw to pivot in the opening direction so that the eyecup can be easily detached by the user.

Japanese Utility Model Application Laid-Open No. 4-130932 discusses a configuration in which an elastic member such as a rubber member is almost integrated to the camera body in the periphery of the eyepiece frame provided in the camera body.

Japanese Patent Application Laid-Open No. 9-222569 discusses a configuration in which each of the eyepiece frame and the eyecup provided in the camera body is threaded, and the eyecup is attached by screwing into the eyepiece frame.

Meantime, the eyepiece frame is often used as an attaching position of various accessories in addition to the eyecup, for example, an eyepiece cap and a magnifier. Hence, when these accessories are attached, the eyecup that is highly frequently used needs to be detached in each case, and therefore, the eyecup is useful if it is easily detachable. On the other hand, it is not desirable that the eyecup is unintentionally detached when the user takes the camera in and out from a camera bag.

The eyecup discussed in Japanese Utility Model Application Laid-Open No. 2-89435 is designed such that the claw portion formed in the eyecup claw is engaged with the step portion formed in the groove portion of the eyepiece frame so that the eyecup cannot be easily detached. However, when the user intentionally detaches the eyecup, a user needs to detach the eyecup by elastically deforming the eyecup while the eyecup is climbing over the step portion. Accordingly, when an amount of the engagement with the step portion is increased, a problem arises that the eyecup is difficult to be detached. On the contrary, when the amount of the engagement is decreased to improve the detachability, the eyecup can be unintentionally detached. To solve these problems, an improved eyecup described above is provided with the operating portion to enable the eyecup claw to pivot. That is, when the user intentionally detaches the eyecup, the user manipulates the operating portion, and the user detaches the eyecup after the claw portion formed in the eyecup claw comes off from the step portion formed in the groove of the eyepiece frame. Thus, the detachment can be easily performed.

In the eyecup discussed in Japanese Utility Model Application Laid-Open No. 4-130932, an elastic member such as a rubber member is directly integrated to the camera body at the peripheral surface of the eyepiece frame, and the eyecup is difficult to be detached without the user's operation.

In the eyecup discussed in Japanese Patent Application Laid-Open No. 9-222569, the eyepiece portion and the eyecup are fixed by a screw, and a problem that the eyecup unintentionally comes off can be avoided.

However, the conventional eyecups have the following problems.

In Japanese Utility Model Application Laid-Open No. 2-89435, it is only the elasticity of the eyecup claw that exerts a force in the engaging direction of the claw portion and the step portion. Hence, when a larger force than the elasticity acts, the eyecup claw opens up and the claw portion comes off from the step portion. As a result, the problem that the eyecup unintentionally comes off cannot be completely avoided.

In Japanese Utility Model Application Laid-Open No. 4-130932, when another accessory is attached to the eyepiece frame, a part of the elastic member such as a rubber member needs to be elastically deformed, and problem may arise that the operation becomes troublesome or the elastic member is damaged. Also, during the assembly of the camera, the elastic member needs to be elastically deformed and attached to the eyepiece frame, so that the assembly of the camera cannot be easily performed and the elastic member can be damaged.

In Japanese Patent Application Laid-Open No. 9-222569, when another accessory is attached, the eyecup needs to be rotated and detached, and there is a problem that the operability is low since the eyecup cannot be quickly detached. Because each of the eyepiece portion and the eyecup needs to be threaded, the cost is increased.

SUMMARY OF THE INVENTION

According to an aspect of the present invention, an accessory unit configured to be mountable on an eyepiece portion, includes an engaging member having an engaging claw portion engageable with the eyepiece portion, an operating portion configured to manipulate by a user so that the engaging claw portion is displaced in a direction of releasing the engagement of the engaging claw portion and the eyepiece portion, and a mechanism portion configured to displace the engaging claw portion in a direction such that the engaging claw portion and the eyepiece portion are engaged with each other when a force is applied to the accessory unit mounted on the eyepiece portion in a direction opposite to the mounting without manipulating the operating portion.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
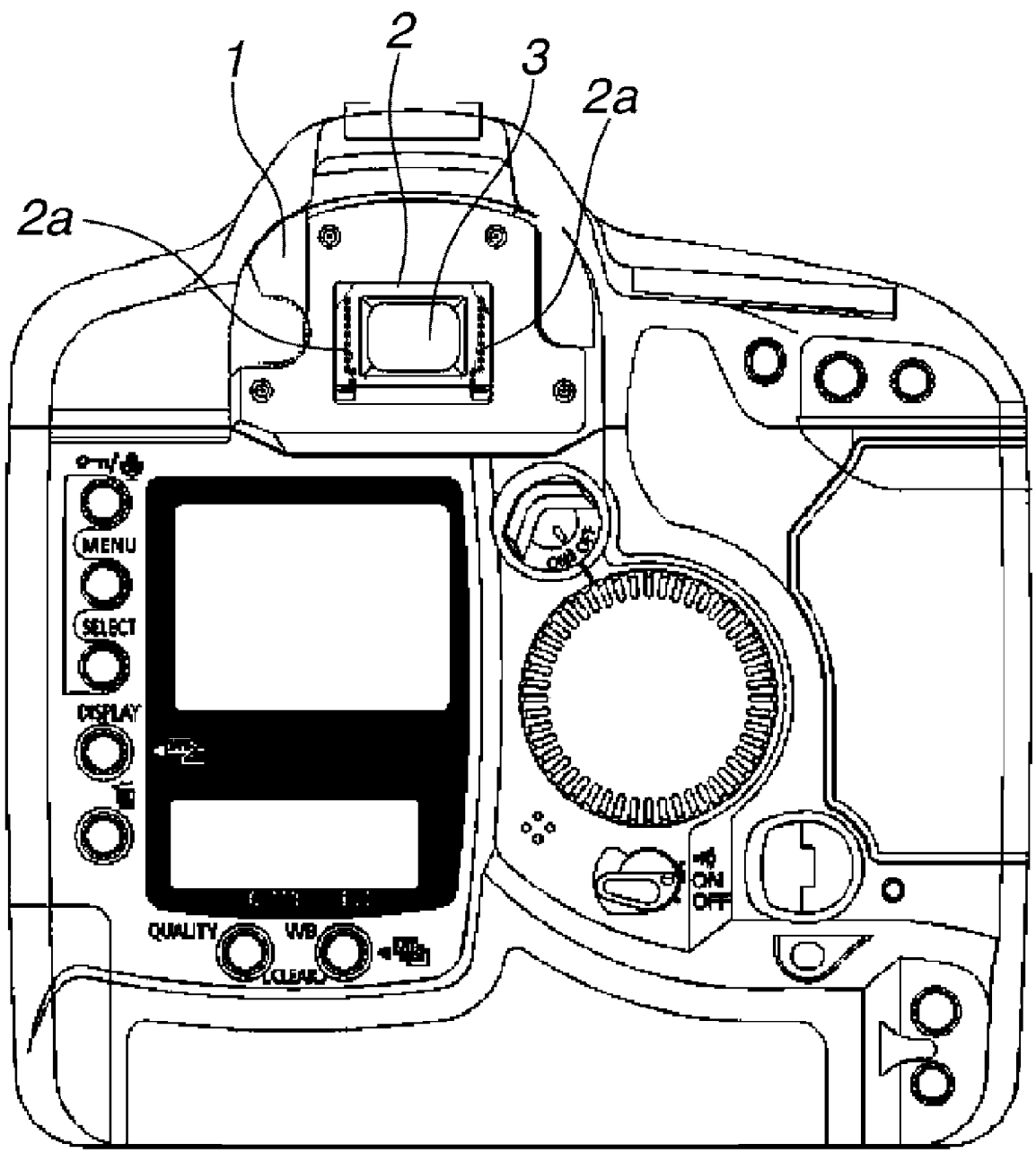
FIG. 1 is a rear view of an example camera body to which an eyecup is attached, according to a first exemplary embodiment of the present invention.
Figure 2:
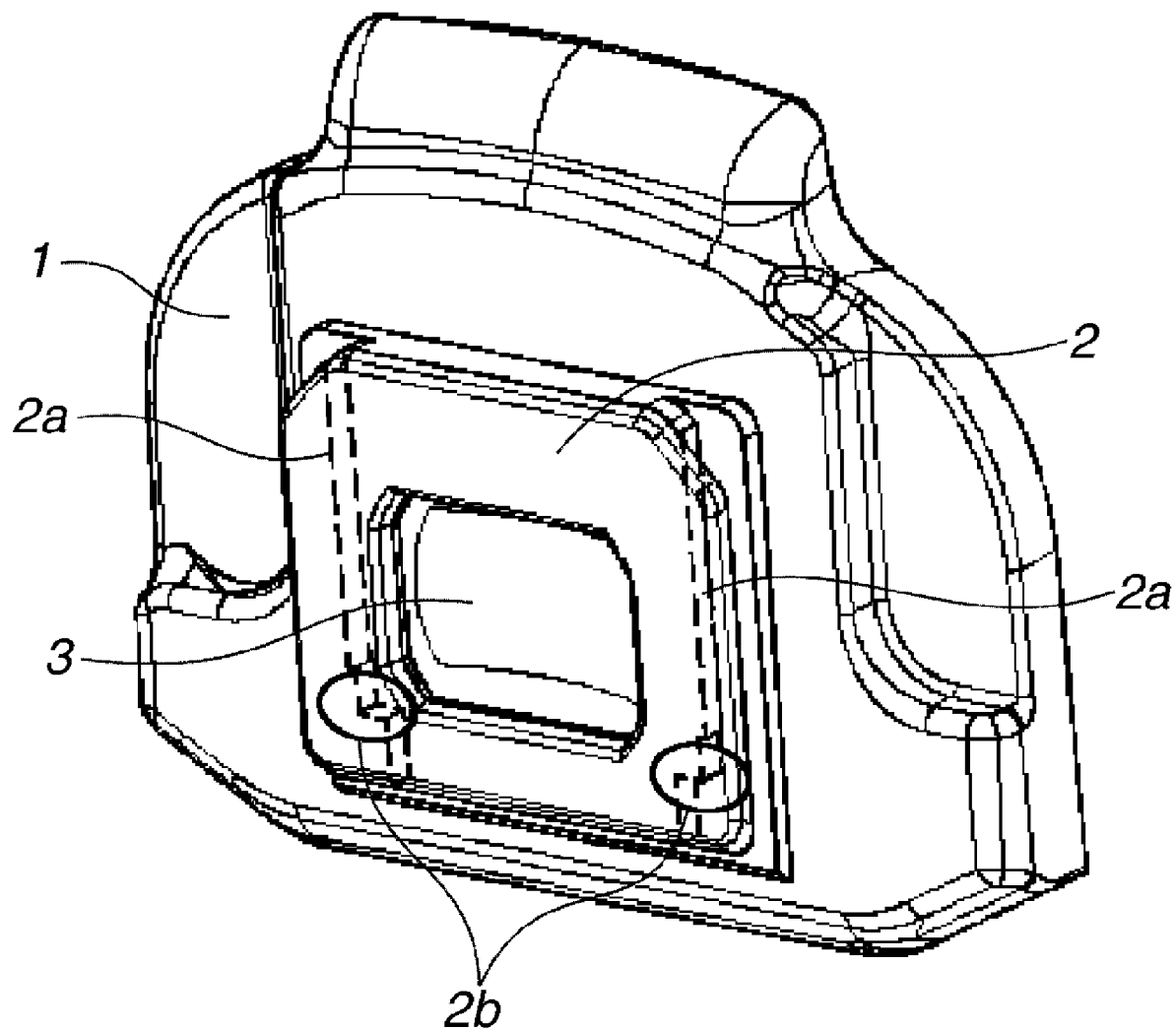
FIG. 2 is a perspective view illustrating details of a part of an eyepiece frame of the camera body.

FIG. 1 is a rear view of a camera body to which an eyecup is attached, according to a first embodiment of the present invention, and illustrates a state in which the eyecup is detached. FIG. 2 is a perspective view illustrating the detail of a principal part of an eyepiece frame of the camera body.

In FIGS. 1 and 2, an eyepiece cover 1 is provided on the rear upper portion of a camera body, and the eyepiece cover 1 is integrally formed with an eyepiece frame 2. The eyepiece cover 1 holds an eyepiece lens 3. On both sides of the eyepiece frame 2, eyepiece frame grooves 2a configured to attach various eyepiece accessories including an eyecup according to the present exemplary embodiment are provided extending upward and downward. At each lower end of the eyepiece frame grooves 2a, a step portion 2b is formed.

Figure 3:
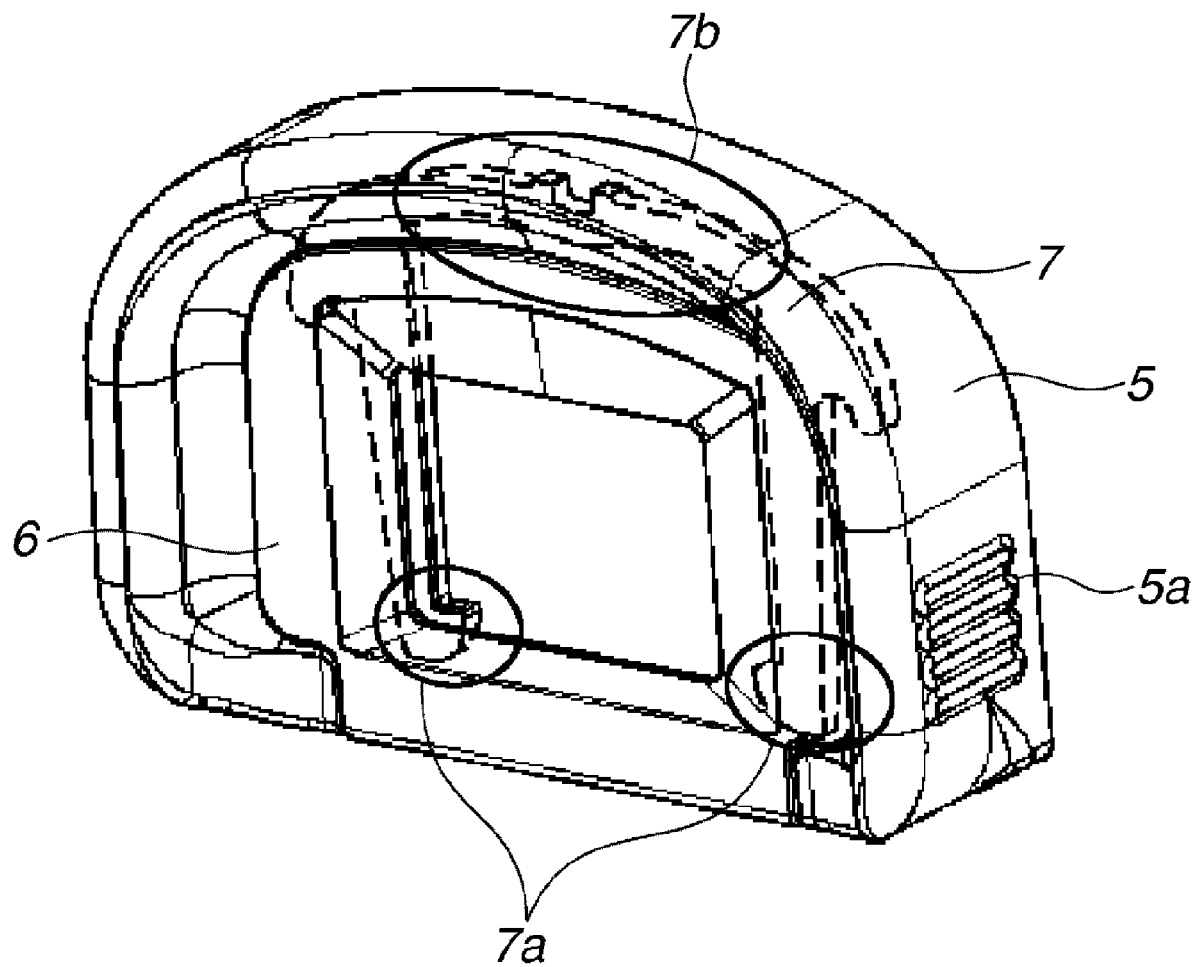
FIG. 3 is a perspective view illustrating a part of the eyecup according to the first embodiment.
Figure 4:
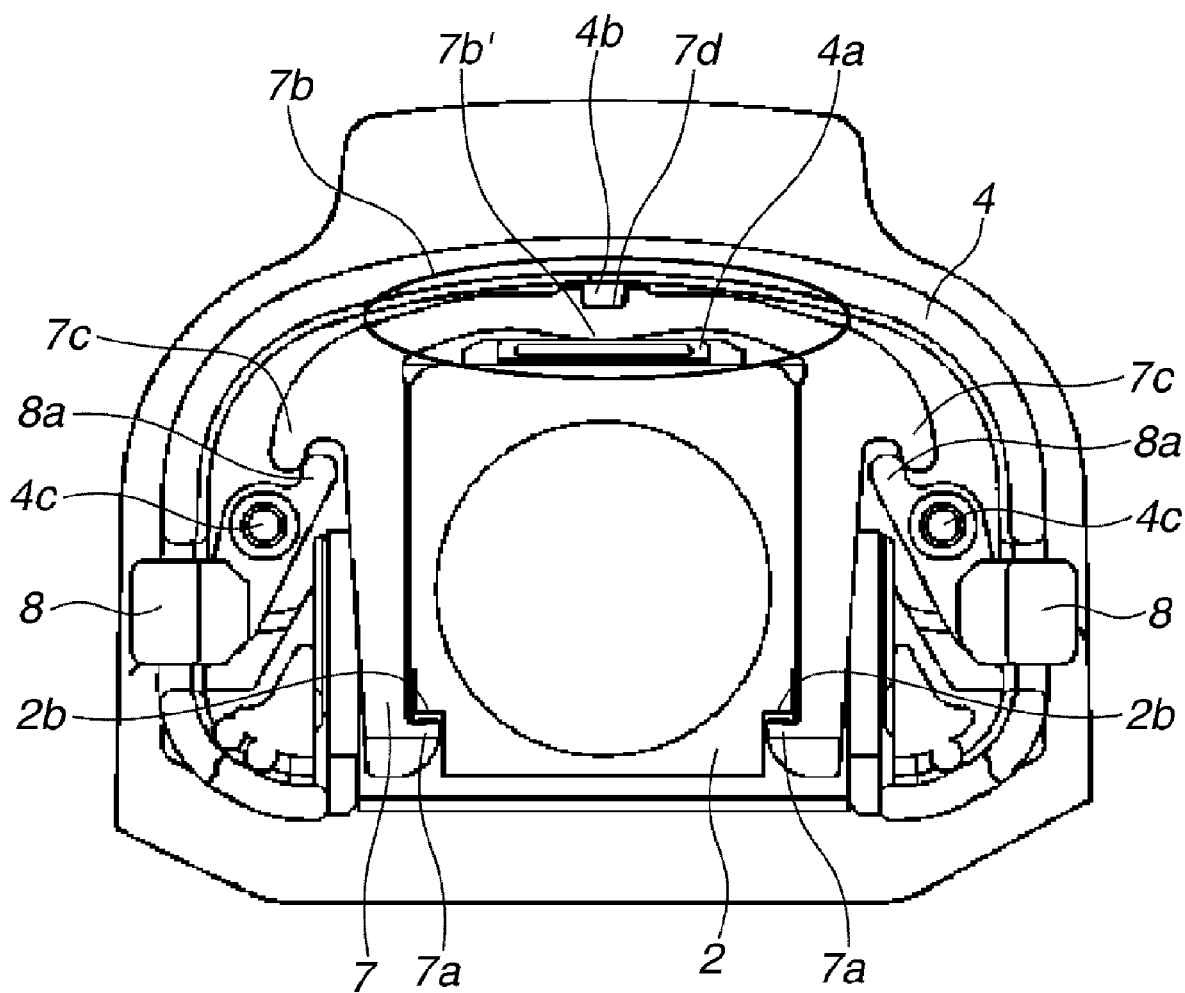
FIG. 4 is a cross-sectional view illustrating detailed configurations of the eyecup and the eyepiece frame according to the first exemplary embodiment of the present invention.

Referring to FIGS. 3 and 4, a configuration of the eyecup according to the present embodiment will be described. FIG. 3 is a perspective view illustrating a principal part of the eyecup according to the first embodiment, and illustrates a state when the eyecup is not attached to the camera body. FIG. 4 is a cross-sectional view illustrating detailed configurations of the eyecup and the eyepiece frame according to the first embodiment, and illustrates a state when the eyecup is attached to the camera body. More specifically, FIG. 4 illustrates a state in which an eyecup rubber member 5 and a cover 6 in the state of FIG. 3 are detached, and the eyepiece frame 2 is illustrated in a cross-sectional state.

As illustrated in FIG. 3, the eyecup of the present embodiment includes an eyecup rubber member 5, a cover 6 having a visual field frame, and an eyecup claw 7. The eyecup rubber member 5 is provided to improve the user's feel when the user looks through a finder. The cover 6 is bonded and adheres to an eyecup main body 4 (FIG. 4) together with the eyecup rubber member 5.

The eyecup claw 7 has claw portions 7a at both sides. When the eyecup is mounted on the eyepiece frame 2, the claw portion 7a is caught by the step portion 2b, and cannot easily come off. An elastic portion 7b is formed in the eyecup claw 7. Inside the eyecup rubber member 5, operating portions 8 are provided at right and left sides, and the claw portion 7a can be rotated by pushing a convex portion 5a formed in the eyecup rubber member 5 (the detail will be described later). The eyecup of the present embodiment is attached to the camera body by fitting the eyecup claw 7 into the eyepiece frame groove 2a of the eyepiece frame 2 in the camera body.

As illustrated in FIG. 4, the eyecup main body 4 is provided with an operating portion 8. The operating portion 8 is rotatably attached to a shaft 4c formed in the eyecup main body 4. In the eyecup main body 4, a protruded portion 4a and a positioning portion 4b are formed. A concave portion 7d formed in the eyecup claw 7 is engaged with the protruded portion 4b, so that the position of the eyecup claw 7 is determined.

When the eyecup is attached to the eyepiece frame 2 formed in the camera body, the following action is taken. The eyecup claw 7 is inserted into the eyepiece frame groove 2a formed in the eyepiece frame 2 while the elastic portion 7b is elastically deformed and outwardly spreads following the shape of the groove. The claw portion 7a of the eyecup claw 7 drops into and engages with the step portion 2b of the eyepiece frame 2.

Figure 5:
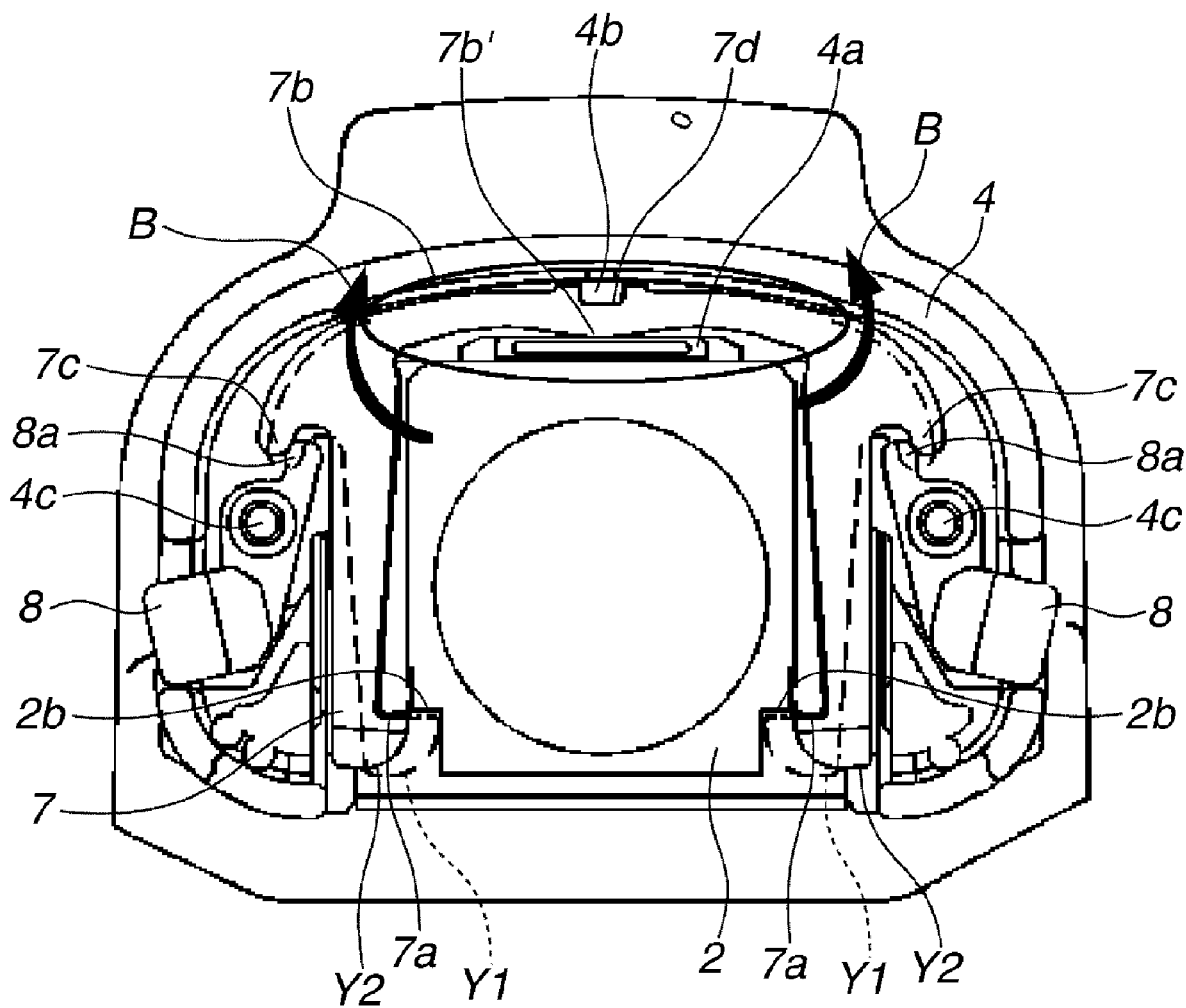
FIG. 5 is a cross-sectional view illustrating an operating state when the eyecup is detached from the eyepiece frame in the configurations of the eyecup and the eyepiece frame of FIG. 4.

Next, the detachment of the eyecup from the eyepiece frame 2 will be described with reference to FIG. 5. FIG. 5 is a cross-sectional view illustrating an operating state when the eyecup is detached from the eyepiece frame 2 in the configurations of the eyecup and the eyepiece frame 2 of FIG. 4.

When the eyecup is detached from the eyepiece frame 2, the following action is taken. When the convex portion 5a (see FIG. 3) formed in the eyecup rubber member 5 is pushed, the operating portion 8 which is inside the eyecup rubber member 5, pivots about the shaft 4c formed in the eyecup main body 4. As a result, a cam portion 8a formed in the operating portion 8 pushes a cam portion 7c formed in the eyecup claw 7. The elastic portion 7b is elastically deformed in a direction of an arrow B illustrated in FIG. 5, and the claw portion 7a is retracted from the step portion 2b (in FIG. 5, from a broken line state Y1 into a solid line state Y2).

While the claw portion 7a is retracted from the step portion 2b, the eyecup is pulled upward from the paper surface in FIG. 5, so that the user can easily detach the eyecup. A force is applied to the eyecup in the detaching direction without manipulating an operating portion 8, which will be described below with reference to FIG. 6.

Figure 6:
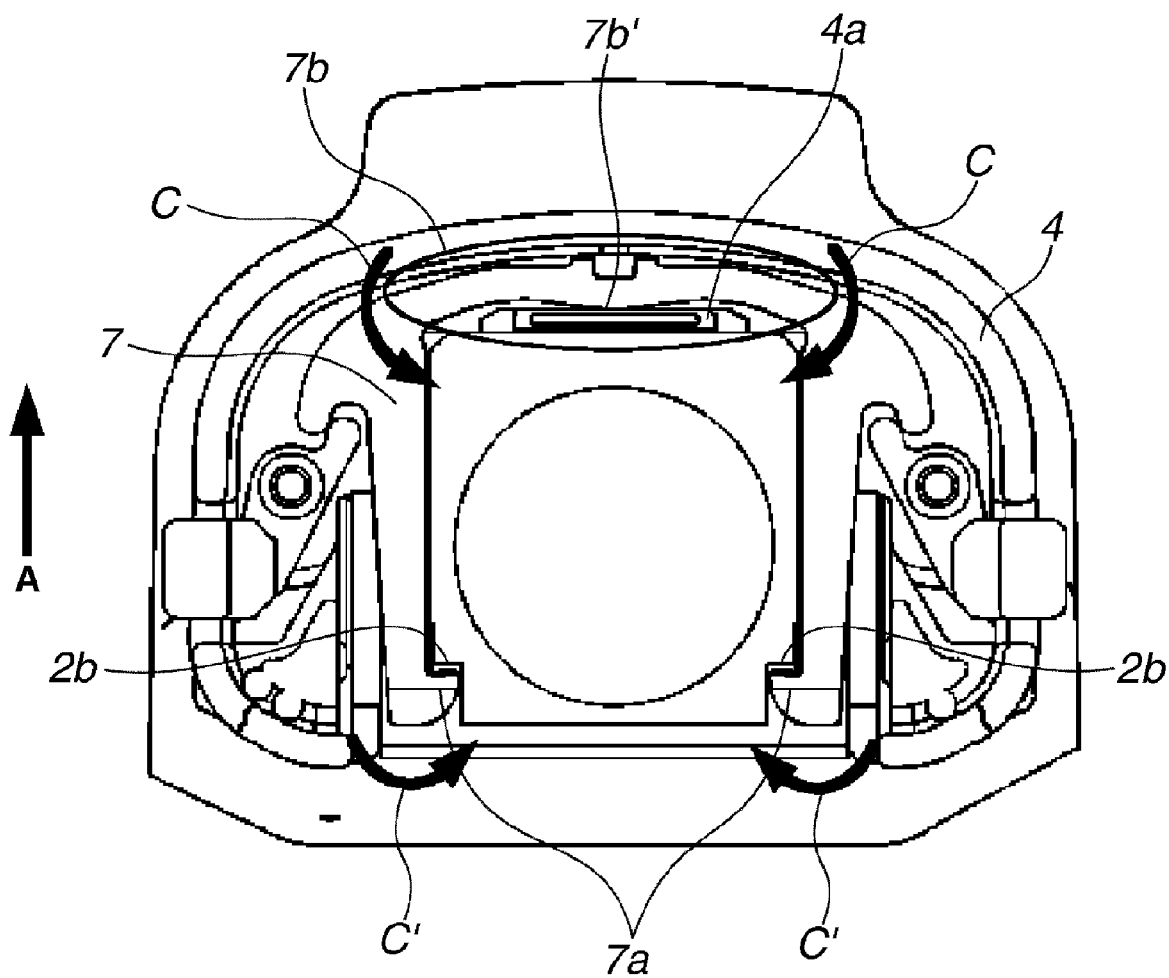
FIG. 6 is a cross-sectional view illustrating an operating state when a force is applied to the eyecup in a detaching direction without manipulating an operating portion, in the configurations of the eyecup and the eyepiece frame of FIG. 4.

FIG. 6 is a cross-sectional view illustrating an operating state when a force is applied to the eyecup in the detaching direction without manipulating the operating portion 8 in the configurations of the eyecup and the eyepiece frame 2 of FIG. 4.

For example, when the camera body is put into a camera bag, often, a force is unintentionally applied to the eyecup in a detaching direction. When a force is applied to the eyecup in the detaching direction (an upward direction from the paper surface in FIG. 6) without manipulating an the operating portion 8, the eyecup main body 4 moves in the direction to an arrow A of FIG. 6.

As a result, the protruded portion 4a formed in the eyecup main body 4 pushes up about a center portion (7b' portion) of the elastic portion 7b of the eye claw 7. Then, the elastic portion 7b is elastically deformed in the direction (direction of the arrow C of FIG. 6) such that the claw portion 7a of the eyecup claw 7 clamps the step portion 2b of the eyepiece frame 2, and therefore, a force in the direction of the arrow C' is applied to the claw portion 7a. That is, a force to maintain the engaging state of the claw portion 7a and the step portion 2b is generated, and prevents the claw portion 7a from coming off the step portion 2b. As a result, the eyecup does not easily come off.

According to the present embodiment, when the user manipulates the operating portion 8 to detach the eyecup from the eyepiece frame 2 formed in the camera body, the following action is taken. In this case, the elastic portion 7b is elastically deformed (in the direction of an arrow B in FIG. 5) so that the claw portion 7a formed in the eyecup claw 7 pivots in a direction of retracting from the step portion 2b formed in the eyepiece frame 2. Thus, the user can easily detach the eyecup.

When the operating portion 8 is not manipulated, if a force is applied to the eyecup in a direction of detaching from the eyepiece frame 2, the following action is taken. The elastic portion 7b is elastically deformed (in the direction of the arrow C in FIG. 6) in a direction such that the claw portion 7a of the eyecup claw 7 clamps the step portion 2b. As a result, the eyecup can be prevented from unintentionally coming off from the camera body.

Since it is possible to detach and attach the eyecup by simply manipulating the operating portion 8 without deforming the elastic portion such as a rubber member, the detachment and the attachment of the eyecup can be easily performed. As a result, damaging of the eyecup at the time of detachment and attachment can be avoided. Moreover, a threading process can be eliminated, and an inexpensive eyecup can be manufactured.

Second Exemplary Embodiment

In a second embodiment of the present invention, only the configuration of the eyecup is different from the first embodiment, and the configurations of the camera body, the eyepiece, and the like are the same or similar as those of the first embodiment. The component parts attached with the same reference numerals as in the first embodiment have the same functions, therefore, the description about them will not be repeated.

Figure 7:
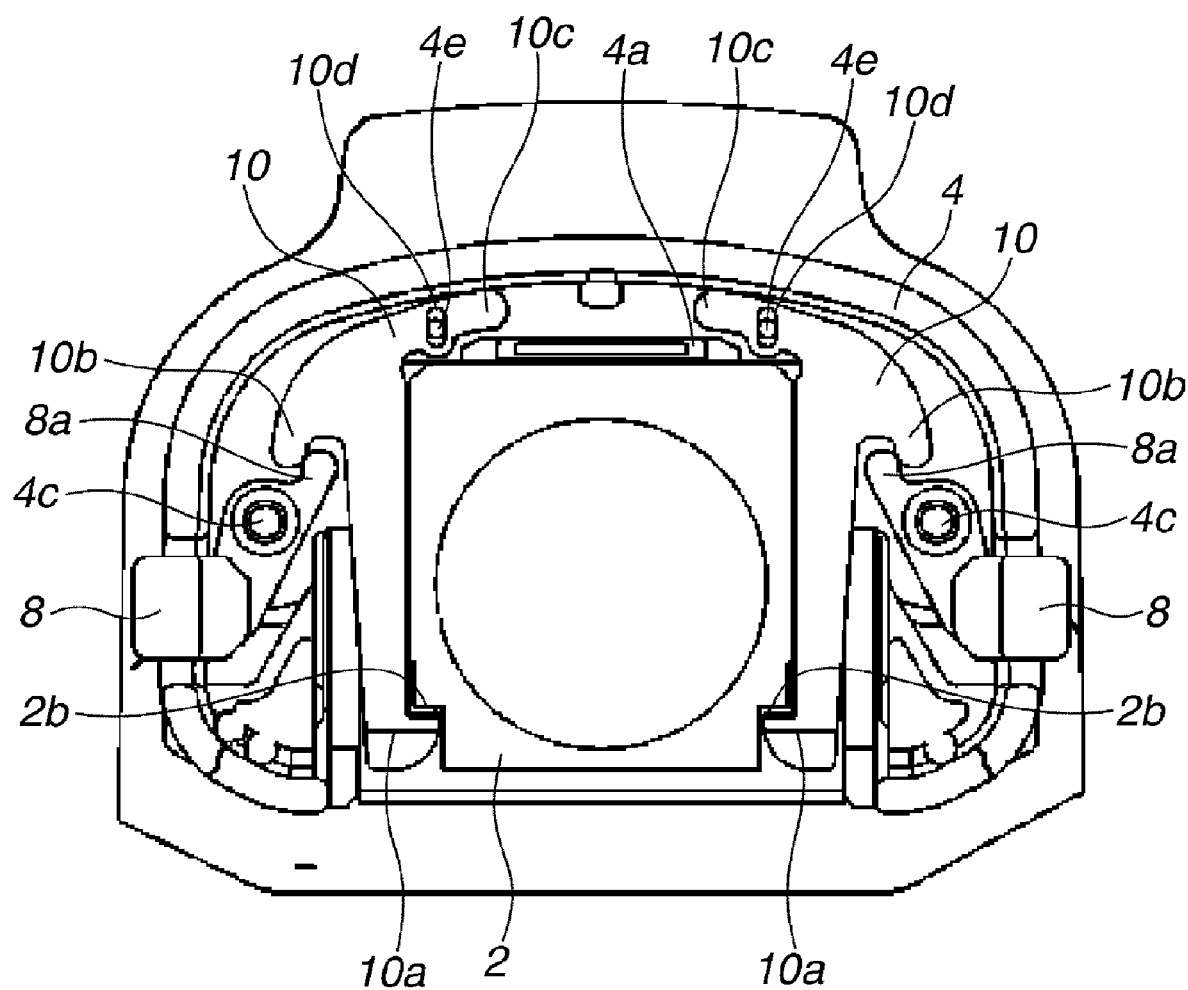
FIG. 7 is a cross-sectional view illustrating the configurations of an eyecup and an eyepiece frame according to a second exemplary embodiment of the present invention.

FIG. 7 is a cross-sectional view illustrating the configurations of an eyecup and an eyepiece frame according to a second embodiment, and illustrates a state in which the eyecup is attached to a camera body. More specifically, FIG. 7 illustrates a state in which an eyecup rubber member 5 and a cover 6 are detached. An eyepiece frame 2 is illustrated in a cross-sectional state.

As illustrated in FIG. 7, an eyecup claw 10 of the eyecup according to the second embodiment is divided into two pieces. That is, one pair of the eyecup claws 10 is attached to the right and left sides of an eyecup main body 4 in which eyecup shafts 4e are provided respectively. In each of the eyecup claws 10, a claw portion 10a, a cam portion 10b, and a long hole shape portion 10d are formed. Each extended portion 10c of the eyecup claw 10 is formed in a direction to a center of the eyecup main body 4 from a long hole shape portion 10d.

The cam portion 10b of each eyecup claw 10 is disposed at a position where the cam portion 10b engages with a cam portion 8a formed in the operating portion 8. The long hole shape portion 10d is provided in a direction of detaching the eyecup from an eyepiece frame 2, and is movably fitted into an eyecup claw shaft 4e formed in the eyecup main body 4.

When the eyecup according to the present embodiment is attached to the eyepiece frame 2 formed in the camera body, the following action is taken.

The eyecup claw 10 has appropriate flexibility in a lateral direction in FIG. 7. When the eyecup of the second embodiment is to be attached to the eyepiece frame 2, the eyecup claw 10 is inserted into the eyepiece frame groove 2a formed in the eyepiece frame 2 while the eyecup claw 10 outwardly spreads following the shape of the groove. A claw portion 10a drops into and engages with a step portion 2b of the eyepiece frame 2.

Next, the eyecup that is to be detached from the eyepiece frame 2 will be described. When a convex portion 5a (see FIG. 3) formed in an eyecup rubber member 5 is pushed, the operating portion 8 which is inside the eyecup rubber member 5 pivots about a shaft 4c formed in the eyecup main body 4. As a result, the cam portion 8a formed in the operating portion 8 pushes a cam portion 10b formed in the eyecup claw 10.

As a result, the eyecup claw 10 pivots around the eyecup claw shaft 4e formed in the eyecup main body 4 in a direction such that the claw portion 10a retracts from the step portion 2b. When the claw portion 10a is completely retracted from the step portion 2b, the eyecup is pulled up, so that the eyecup can be easily detached.

Next, a force applied to the eyecup in the detaching direction without manipulating the operating portion 8 will be described with reference to FIG. 8.

Figure 8:
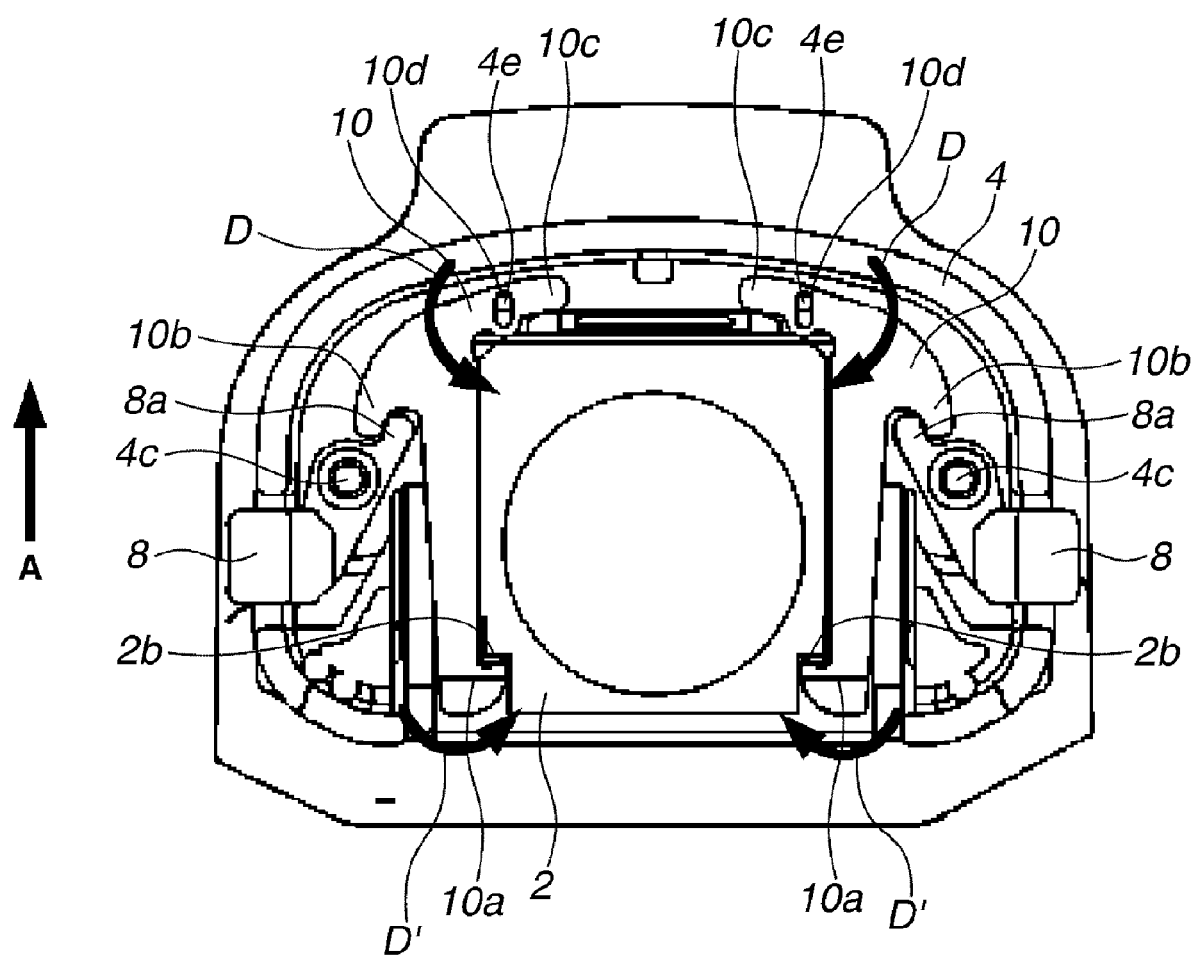
FIG. 8 is a cross-sectional view illustrating an operating state when a force is applied to the eyecup in a detaching direction without manipulating an operating portion in the configurations of the eyecup and the eyepiece frame of FIG. 7.

FIG. 8 is a cross-sectional view illustrating an operating state when a force is applied to the eyecup in the detaching direction without manipulating the operating portion 8 in the configurations of the eyecup and the eyepiece frame of FIG. 7.

When a force is applied to the eyecup in the detaching direction (upward from the paper surface in FIG. 7) without manipulating the operating portion 8, the eyecup main body 4 moves in the direction of an arrow A of FIG. 8. As a result, a protruded portion 4a formed in the eyecup main body 4 pushes up an extended portion 10c formed in the eyecup claw 10. Then, a force is generated and applied to the eyecup claw 10. The force rotates the eyecup claw 10 in the direction of an arrow D of FIG. 8 around the eyecup claw shaft 4e formed in the eyecup main body 4. At the same time, a force acts in the direction (direction of an arrow D') such that the claw portion 10a of the eyecup claw 10 clamps the step portion 2b of the eyepiece frame 2. That is, a force to maintain the engaging state of the claw portion 10a and the step portion 2b is generated, and prevents the claw portion 10a from coming off the step portion 2b. As a result, the eyecup does not easily come off.

According to the present embodiment, when the user manipulates the operating portion 8 to detach the eyecup from the camera body, the claw portion 10a formed in the eyecup claw 10 pivots in the direction of retracting from the step portion 2b formed in the eyepiece frame 2. Hence, the user can easily detach the eyecup from the camera body.

When a force is applied in the direction such that the eyecup is detached from the eyepiece frame 2 when the operating portion 8 is not manipulated, the following action is taken. A force is applied in the direction such that the claw portion 10a of the eyecup claw 10 clamps the step portion 2b. As a result, the eyecup can be prevented from unintentionally coming off the camera body.

Similar to the first embodiment, an easily detachable eyecup can be realized at a low cost.

Other Exemplary Embodiments

While the above two embodiments have illustrated the configurations used in the finder eyecup of the camera, the embodiments are not limited to the eyecup. The embodiments can be applied to an accessory unit that is detachably attached to the eyepiece portion of the camera body such as a magnifier.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-024176 filed Feb. 2, 2007, which is hereby incorporated by reference herein in its entirety.

What is claimed is:

1. An accessory unit configured to be mountable on an eyepiece portion of a device, the accessory unit comprising:
    an engaging member having an engaging claw portion engageable with the eyepiece portion;
    an operating portion configured to be manipulated by a user so that the engaging claw portion is displaced in a direction of releasing the engagement of the engaging claw portion and the eyepiece portion; and
    a mechanism portion configured to displace the engaging claw portion in a direction such that the engaging claw portion and the eyepiece portion are engaged with each other when a force is applied to the accessory unit mounted on the eyepiece portion in a direction opposite to the mounting without manipulating the operating portion.

2. An accessory unit configured to be mountable on an eyepiece portion of a device, the accessory unit comprising:
    an engaging member having an engaging claw portion engageable with the eyepiece portion and an elastic portion which displaces the engaging claw portion by elastically deforming; and
    an operating portion configured to be manipulated by a user so that the elastic portion is elastically deformed to displace the engaging claw portion in a direction of releasing engagement of the engaging claw portion and the eyepiece portion by manipulating the operating portion; and
    a pressing portion configured to press the elastic portion when a force is applied to the accessory unit mounted on the eyepiece portion in a direction opposite to the mounting without manipulating the operating portion, wherein when the pressing portion presses the elastic portion, the elastic portion is elastically deformed to displace the engaging claw portion in a direction such that the engaging claw portion and the eyepiece portion are engaged with each other.

3. The accessory unit according to claim 2, wherein groves are formed at both sides of the eyepiece portion, the engaging claw portions are formed in a pair, and the engaging claw portions enter each of the grooves.

4. The accessory unit according to claim 3, wherein the elastic portion connects one pair of the engaging claw portions with each other.

5. The accessory unit according to claim 4, wherein the pressing portion presses the center portion of the elastic portion in a direction opposite to the mounting direction of the accessory unit.

6. The accessory unit according to claim 5, wherein the pressing portion is integrally formed with an accessory unit main body.

7. The accessory unit according to claim 6, wherein the accessory unit main body includes a positioning portion configured to position the engaging member to the accessory unit main body, and the pressing unit presses a back side of a surface on which the engaging member contacts the positioning unit.

8. An accessory unit configured to be mountable on an eyepiece portion of a device, the accessory unit comprising:
    an engaging member having an engaging claw portion engageable with the eyepiece portion, the engaging member being held pivotally in a direction of engaging the engaging claw portion and the eyepiece portion with each other, and in a direction of releasing the engagement of the engaging claw portion and the eyepiece portion; and
    an operating portion configured to be manipulated by a user so that the engaging claw portion is rotated to displace the engaging claw portion in the direction of releasing the engagement of the engaging claw portion and the eyepiece portion, and
    a pressing portion configured to press the engaging claw portion when a force is applied to the accessory unit mounted on the eyepiece portion in the direction opposite to the mounting without manipulating the operating portion, wherein when the pressing portion presses the engaging claw portion, the engaging claw portion is rotated to displace the engaging claw portion in the direction of engaging the engaging claw portion and the eyepiece portion with each other.

9. The accessory unit according to claim 8, wherein a pivotal center of the engaging member is set between the operating portion and the pressing portion.

10. A camera system including a camera body that has an eyepiece portion configured to be mounted on an accessory unit, and the accessory unit configured to be removably attached to the camera body, the system further including:
    the accessory unit further including,
    an engaging member having an engaging claw portion engageable with the eyepiece portion;
    an operating portion configured to be manipulated by a user so that the engaging claw portion is displaced in an direction of releasing the engagement of the engaging claw portion and the eyepiece portion; and
    a mechanism portion configured to displace the engaging claw portion in a direction of engaging the engaging claw portion and the eyepiece portion with each other when a force is applied in a direction opposite to mounting, to the accessory unit mounted on the eyepiece portion without manipulating the operating portion.

* * * * *